SELF-TUNING FILTER CIRCUIT

Filed April 4, 1945 2 Sheets-Sheet 1

INVENTOR.
ELMER G. HILLS
BY
ATTORNEYS

INVENTOR.
ELMER G. HILLS

BY Mueller, Dodds & Mason

ATTORNEYS

Patented Apr. 4, 1950

2,503,046

UNITED STATES PATENT OFFICE 2,503,046

SELF-TUNING FILTER CIRCUIT

Elmer G. Hills, Chicago, Ill., assignor, by mesne assignments, to Belmont Radio Corporation, Chicago, Ill., a corporation of Illinois Application April 4, 1945, Serial No. 586,540

12 Claims. (Cl. 318—30)

Figure 1:
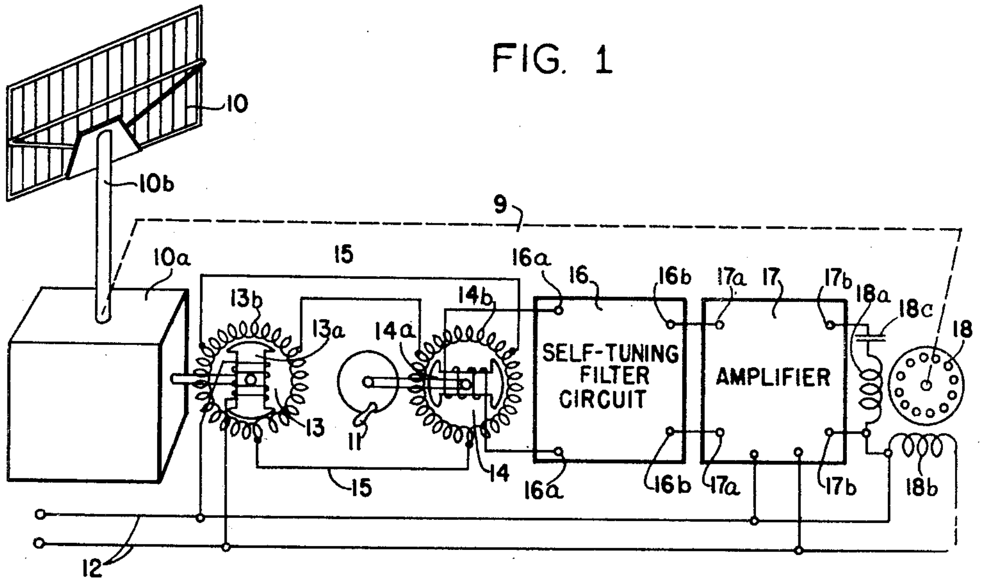

This invention relates to self-tuning filter circuits and, while it is of general application, it is particularly suitable for use in a self-synchronous position-repeating system.

In position-repeating systems of the self-synchronous type, it is well known that, if the system is designed to follow up the position of a primary controlling element rapidly, it has a tendency to overshoot, resultihg in hunting of the system. It has been found that if, during the rebalancing of the system, the phase of the unbalance signal is reversed prior to reaching the balance point, the torque of the balancing motor may be reversed, resulting in dynamic braking of the rebalancing motor. The present invention relates to a filter system which is particularly effective to convert the unbalance signal of such a repeating system to a control signal which reverses its phase during the rebalancing of the system and prior to reaching a condition of balance.

It also occurs that in certain installations of the type described the frequency of the alternating-current supply circuit is subject to variations within an appreciable frequency range. In such an installation it is desirable or necessary to provide a filter having a resonant response which will follow such frequency variations in order to procure an optimum performance of the system under all operating conditions.

It is an object of the invention, therefore, to provide a new and improved self-tuning filter circuit which is effective automatically to follow variations in the frequency of the alternating-current system in which it is connected.

It is another object of the invention to provide a new and improved self-tuning filter circuit which is effective in an alternating-current position-repeating system to convert the unbalance signal of the system into a control signal which reverses phase during the rebalancing operation and thus is effective to provide dynamic braking of the rebalancing motor.

In accordance with the invention, a self-tuning filter circuit for following variations in frequency of an applied periodic wave comprises a pair of input terminals and a pair of branch circuits connected in parallel between the input terminals, each including series-connected resistance and reactance elements, such elements being arranged in opposite order in the pair of circuits. The filter circuit also includes a bridging circuit comprising series-connected resistance and reactance elements connected between midpoints of the branch circuits and a pair of output terminals individually connected to the midpoint of the bridging circuit and to one of the input terminals. By virtue of this circuit arrangement, the response at the output terminals exhibits resonance characteristics and there are provided means responsive to the frequency of the signal applied to the input terminals for varying the value of one of the circuit elements to maintain such resonant response at the output terminals.

Further in accordance with the invention, in a position-repeating system including an alternating-current supply circuit, signal-transmitting and signal-receiving devices energized from the supply circuit and connected to form a normally balanced signaling circuit, and a polyphase positioning motor responsive to the unbalance of the signaling circuit and connected to one of the devices to rebalance such circuit, there is provided a self-tuning filter circuit of the type described having its input terminals connected to the signaling circuit and its output terminals connected to the motor. By this arrangement, the filter circuit is effective, during transition from an unbalanced condition of the signaling circuit toward the balanced condition thereof, to develop an alternating output signal which reverses phase and is effective to reverse the torque of the positioning motor to prevent overshooting thereof.

For a better understanding of the invention, together with other and further objects thereof, reference is had to the following description taken in connection with the accompanying drawings while its scope will be pointed out in the appended claims.

Figure 2:
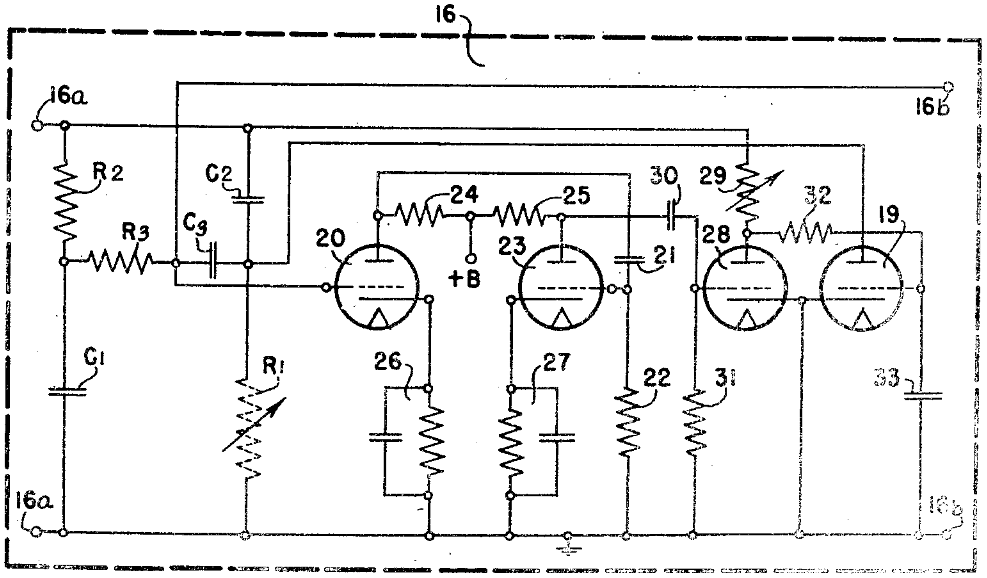
Figures 3, 4, 5:
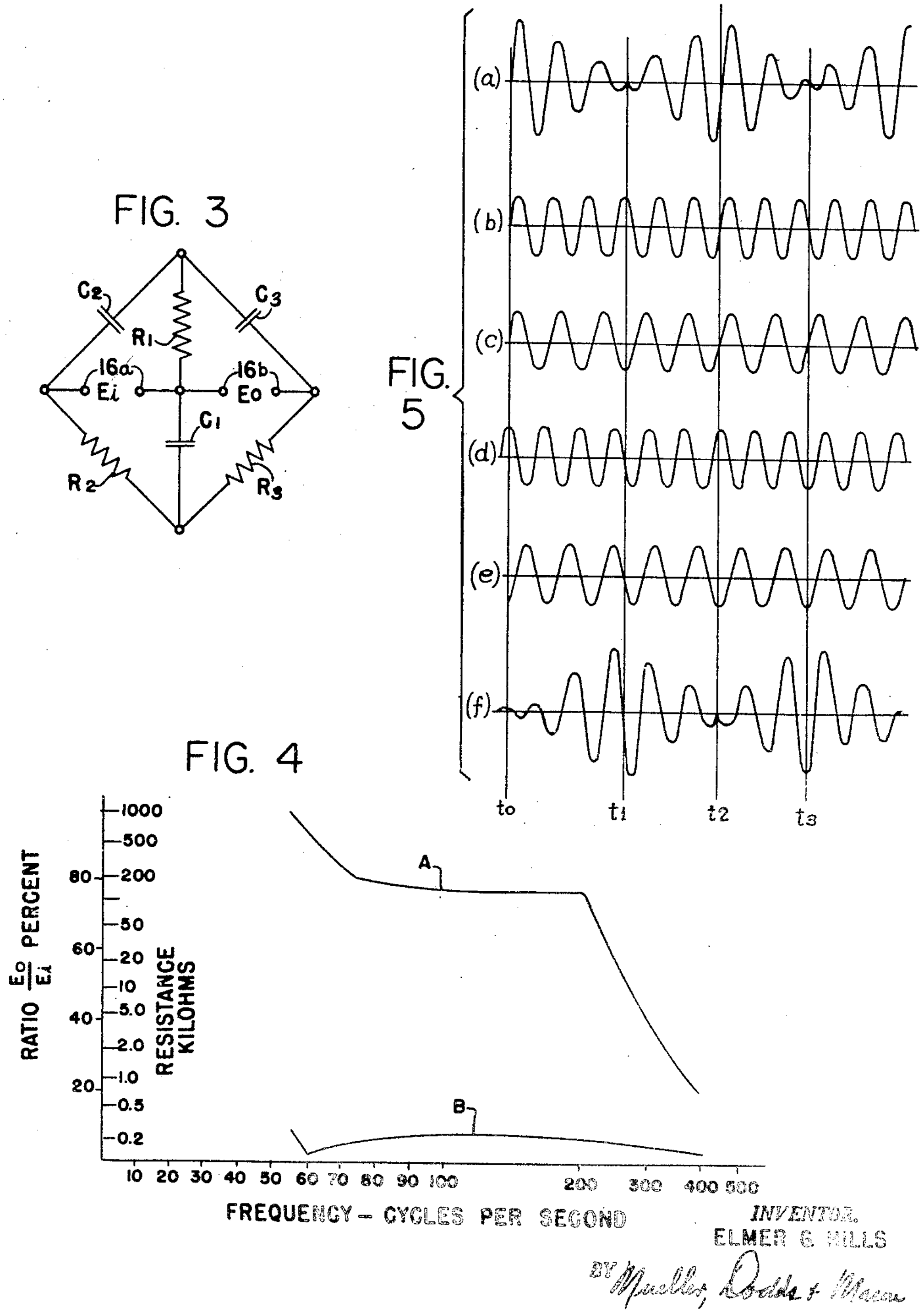

Referring now to the drawings, Fig. 1 is a schematic representation of a self-synchronous position-repeating system to which the filter of the invention is particularly applicable; Fig. 2 is a circuit diagram of a self-tuning filter circuit of the invention; Fig. 3 is a simplified equivalent circuit diagram of the filter network of Fig. 2 with the automatic control feature omitted; Fig. 4 is a graph representing certain operating characteristics of the filter of Figs. 2 and 3; while Fig. 5 is a series of graphs to aid in the explanation of the operation of the filter of Fig. 2.

Referring now to Fig. 1 of the drawings, there is represented a position-repeating system incorporating a self-tuning filter circuit embodying the invention. This position-repeating system is illustrated as applied to the positioning of a directive antenna 10 in accordance with the position of a primary controlling element, such as a hand crank 11. The system includes an alternating-current supply circuit 12, a signal-transmitting device 13 energized from the supply circuit 12 and a signal-receiving device 14, the devices 13 and 14 being connected to form a normally balanced signaling circuit. Each of the devices 13 and 14 may be in the form of a synchronous motor, the rotor winding 13a of the device 13 being connected to supply circuit 12, the polyphase stator windings 13b and 14b being interconnected over the conductors 15, and the rotor winding 14a of the device 14 constituting the output circuit of the signaling circuit at which appears the unbalance signal of the circuit. The rotor of the device 14 is connected to be operated by the hand crank 11 while the rotor of the device 13 is connected to be operated by a mechanism 10a connected with the rotatable antenna 10 by means of a shaft 10b.

The rotor winding 14a of the device 13 is connected to the input terminals 16a of a self-tuning filter circuit 16 embodying the invention and described in detail hereinafter. The output terminals 16b of the filter circuit 16 are connected to the input terminals 17a of an amplifier 17, the output terminals 17b of which are connected through a phase-shifting condenser 18c to one winding 18a of a polyphase positioning motor 18, the other phase winding 18b being connected to the supply circuit 12 so that the motor 18 is responsive to the unbalance of the signaling circuit. The motor 18 is connected by the mechanism schematically represented by the dashed-line 9 to rotate the shaft 10b of the antenna 10 and, through the mechanism 10a, is connected to the rotor of the device 13 to rebalance the signaling circuit.

A circuit diagram of the self-tuning filter circuit 16 of Fig. 1 is shown in Fig. 2. This circuit comprises a pair of input terminals 16a connected to the signaling circuit, as described, and a pair of output terminals 16b connected to the amplifier 17, as described. The filter circuit is of conventional double-T configuration designed to have a minimum or substantially zero response at its output terminals at the normal frequency of the supply circuit 12 but having a substantial response at frequencies displaced therefrom. Specifically, the self-tuning filter circuit 16 comprises a pair of branch circuits connected in parallel between the input terminals 16a, each including series-connected resistance and reactance elements, the elements being arranged in opposite order in the two circuits of the pair. For example, the first branch circuit comprises a resistor $R_2$ in series with a condenser $C_1$, connected in the order named, while the second branch circuit comprises a condenser $C_2$ in series with a resistance element $R_1$, also connected in the order named across the input terminals 16a. The resistance element $R_1$ is shown in dotted lines in that it represents the resistance of a bias-controlled impedance device, such as a triode vacuum tube 19 which has its anode-cathode circuit connected between the terminals of the resistance element $R_1$. The filter circuit also includes a bridging circuit comprising a series-connected resistance element $R_3$ and reactance element such as a condenser $C_3$ connected between the mid-points of the two branch circuits; that is, between the junction of the elements $R_2$ and $C_1$ and the junction of the elements $C_2$ and $R_1$. The output terminals 16b are individually connected to the midpoint of the bridging circuit $R_3$, $C_3$ and to one of the input terminals 16a.

By virtue of this circuit connection, the response at the output terminals 16b exhibits resonance characteristics, as more fully described hereinafter.

The filter circuit 16 also includes means responsive to the frequency of the unbalance signal applied to input terminals 16a for varying the value of at least one of the circuit elements, for example the branch resistance element $R_1$, to maintain the resonant response at the output terminals 16b, irrespective of variations of such frequency. The means responsive to the frequency of the unbalance signal may constitute means responsive to the output at terminals 16b for controlling the bias on the bias-controlled device 19. For example, this means may constitute an amplifier, such as a triode vacuum tube 20, to the control electrode of which the signal at the output terminals 16b is applied, the output of the amplifier 20 being connected by way of a phase-advancing circuit comprising a condenser 21 and resistor 22 to the control electrode of a second triode amplifier vacuum tube 23. In order to procure a phase advance approximating 90°, the reactance of condenser 21 at the operating frequency should be of the order of ten times the resistance value of resistor 22. The amplifiers 20 and 23 may be conventional amplifiers having their anode circuits energized from a suitable source +B by way of load resistors 24 and 25, respectively, and provided with cathode self-biasing circuits 26 and 27, respectively. This frequency-responsive means also includes a triode vacuum tube repeater 28 and connections for applying the input signal at the terminals 16a to the anode-cathode circuit of the repeater 28 through an adjustable load resistor 29 and an amplified output signal from terminals 16b to the control electrode thereof through a coupling circuit comprising a condenser 30 in series with a grid resistor 31. With these connections, the output of the repeater 28 is responsive to the phase of the signal at the input terminals 16a relative to that of the output terminals 16b, as explained hereinafter.

The filter circuit 16 also includes means responsive to the output of the vacuum-tube repeater 28 for developing a bias voltage and connections for applying such bias voltage to the bias-controlled impedance device 19. This means comprises a time-constant circuit including a series resistor 32 and condenser 33, the junction of which is connected to the control electrode of the device 19. The values of the elements 32 and 33 are selected so that there is developed by grid rectification in the device 19 a bias voltage of the desired character.

Referring now to Fig. 3, there is represented an equivalent circuit diagram of the double-T filter circuit of Fig. 2 just described in a somewhat more conventional arrangement. In this filter, the first filter T-section comprises the series reactance arms $C_2$ and $C_3$, and a resistive shunt arm $R_1$, while the second filter comprises series resistance arms $R_2$, $R_3$ and a reactive shunt arm $C_1$. The open-end series terminals of the first filter sections are connected to corresponding terminals of the second filter section, these terminals being connected to form an input-terminal 16a, while the open-end terminals of the shunt arms $R_1$, $C_1$ are connected to form a common input and output terminal 16a, 16b. The input terminals of the filter are individually connected to the common terminal and one of the open-end terminals, while the output terminals are individually connected to the common terminal and the other of the open-end terminals, as indicated. As shown, the means responsive to the signal applied to the input terminals is arranged to vary the value of the shunt resistance arm $R_1$ to maintain the resonant response at the output terminals.

Considering first the filter circuit 16 per se. it can be shown that the ratio of the voltage $E_o$ at the output terminals 16b to the input voltage $E_i$ at the input terminals 16a is represented by the expression:

$$\frac{E_o}{E_i}=\frac{(R^4-x^4)[(R^2-x^2)+4jRx]}{R^4(R^2+15x^2)+x^4(15R^2+x^2)}$$

Where

R=normal value of resistor $R_1$
=½ resistance of resistors $R_2$ or $R_3$
$x$=capacitive reactance of condenser $C_1$
=½ the capacitive reactance of condensers $C_2$ or $C_3$ By an appropriate selection of values of the resistances and reactances of the filter elements, the output voltage $E_o$ may be made substantially zero at the resonant frequency of the filter so that the ratio $E_o/E_i$ is also substantially zero at this frequency. The phase of any incidental output voltage $E_o$ at resonance is indeterminate, while at frequencies below the resonant frequency of the filter the phase of the output voltage $E_o$ lags the input voltage $E_i$ by 90° and at frequencies above the resonant frequency of the filter the output voltage $E_o$ leads the input voltage by 90°.

Certain characteristics of the double-T filter described are illustrated in Fig. 4 in which curve A represents the variation of resistance with respect to frequency at the output terminals 16b, while curve B represents the variation in the ratio $E_o/E_i$ with respect to frequency. Curve A is typical of the resistance variation at the output terminals of such a filter, while curve B departs considerably from the ideal curve due to deviations in the values of the circuit elements from their rated or nominal values. If the values of all of the circuit elements were exactly correct, curve B would fall to zero at the frequency of 60 cycles for which the filter was designed. Nevertheless, it is seen that the response at the output terminals $E_o$ is a definite minimum, approaching zero, at 60 cycles and that at frequencies above and below 60 cycles the filter has a substantial response.

Coming now to the operation of the self-tuning components of the filter 16, as represented in Fig. 2, the circuit constants are so proportioned that, at the resonant frequency of 60 cycles, the signal $E_o$ at the output terminals 16b is substantially zero. For signal components below the resonant frequency of the filter, the output voltage lags the input voltage by 90° but is advanced 90° by the phase-shifting circuit 21, 22 into phase coincidence with the input voltage. Conversely, for signal components above the resonant frequency of the filter, the output voltage leads the input voltage by 90° and is advanced a further 90° by the phase shifting circuit 21, 22 into phase opposition with the input voltage. The circuit constants are so selected that, under the condition of resonance the in-phase and out-of-phase components are of equal amplitudes and the bias voltage developed at the control electrodes of the impedance device 19 is of the correct value to impart to this device a resistance $R_1$ of the appropriate value to tune the filter to 60 cycles. If now the frequency of the alternating current derived from the supply circuit 12 should fall for any cause, the signal at the output terminals 16b as amplified and applied to repeater 28 comprises an in-phase component and an out-of-phase component, the former being of the greater magnitude so that the repeater 28 develops an increased output signal. This increased signal, being rectified at the grid of the device 19, increases the negative bias of this device and thereby increases the value of its internal resistance, which is the resistance $R_1$ of the filter. This increase in resistance $R_1$ tends to retune the filter circuit to resonance at the lower frequency.

Conversely, if the frequency of the alternating current derived from the supply circuit 12 tends to rise for any reason, a resultant out-of-phase signal component is applied to the grid of the tube 28, decreasing the output signal of this tube and thereby decreasing the negative bias at the grid of the device 19 to decrease the value of the resistance $R_1$ and thus retune the filter circuit to the higher frequency.

While adjustment of the resistance $R_1$, as described, tends to tune the filter 16 to resonance at the new frequency, the filter no longer is in exact resonance, which can be effected only by a simultaneous adjustment of the values of all of the circuit elements, which are all interdependent. However, within a limited range of operation, the filter exhibits marked resonance characteristics and the resonant response at the output terminals 16b is maintained at a minimum near zero for all operating frequencies within this range.

Consider now briefly the operation of the position-repeating system as a whole. The elements of this system, with the exception of the self-tuning filter circuit 16, are conventional. When the system is in equilibrium, the rotor winding 13a of the device 13 induces a voltage in its distributed stator winding 13b which has a maximum in line with the axis of the rotor 13a. The conductors 15 establish a similar voltage distribution in the winding 14b and, since the rotor winding 14a is normal to this maximum voltage axis, no voltage is induced in the winding 14a. If now the manual crank 11 is operated, an unbalance voltage is induced in the winding 14a the phase of which varies with the direction of adjustment of the crank 11. This voltage is translated by the filter 16, as described hereinafter, amplified in unit 17 and applied to the winding 18a of the motor 18, which is effective to produce rotation of the motor 18 in a direction dependent upon the phase of this unbalance voltage and thus dependent upon the direction of rotation of the manual crank 11. The motor 18 then rotates to actuate the antenna 10 which follows the motion of the crank 11 and takes up a new position corresponding to the final position thereof. Simultaneously the rotor of the signal-transmitting device 13 is adjusted until it again reaches a position normal to the position of the rotor of the signal-receiving device 14, at which the system is again in balance.

The signal-receiving device 14 develops an output or unbalance signal which is of the frequency of the supply circuit 12 but modulated at a frequency corresponding to the speed of rebalance of the signal-transmitting device 13. For example, if it be assumed that the supply circuit 12 is energized by a commercial 60-cycle alternating current and that the signal-transmitting device 13 is being adjusted at a speed corresponding to a frequency of 6 cycles/second, the signal output of the rotor of the signal-receiving device 14 is a modulated signal as represented by curve $a$ of Fig. 5. However, the output signal of the signal-receiving device 14 is not in the form of the usual modulated carrier wave but is represented by the equation:

$$E_1 = \frac{1}{2}E[\sin(w_1+w_2)+\sin(w_1-w_2)]$$

Where:

$E$=the maximum instantaneous signal voltage induced in the rotor winding 14$a$ of the signal-receiving device 14.

$w_1$=angular frequency of the supply circuit 12.

$w_2$=angular frequency of rotation of the rotor of the signal-receiving device 14.

That is, the filter output of the signal is represented by two components, an upper sideband component of the frequency $(w_1+w_2)$ and a lower sideband component of a frequency $(w_1-w_2)$ but no component of the fundamental frequency $w_1$. The signal output of the device 14 is represented by curve $a$ of Fig. 5, while the upper and lower frequency components are represented by curves $b$ and $c$ of Fig. 5.

As pointed out above, the filter circuit 16 is effective to shift the component of the high frequency $(w_1+w_2)$ forward 90° and to retard the component of low frequency $(w_1-w_2)$ by 90°. If the attenuation of the filter 16 and the subsequent amplification of amplifier 17 be represented by a factor A, which is not a constant but varies with frequency, then the resultant signal voltage $E_m$ impressed upon the circuit of the motor winding 18$a$ is represented by the equation: $E_m = \frac{1}{2}AE \sin(w_1+w_2+90)+\sin(w_1-w_2-90)$. The two components of the voltage $E_m$ are represented by curves $d$ and $e$ of Fig. 5. These two components may be combined into a single resultant, expressed by the equation:

$$E_m = AE \sin w_1 \cos(w_2+90)$$

This resultant is represented by curve $f$ of Fig. 5.

That is, the filter output voltage $E_m$, as applied to the circuit of the motor winding 18$a$ varies with $\cos(w_2+90)$. As seen from curves $a$ and $f$, following the null point $t_1$ of the input signal, curve $a$, corresponding to a balance of the signaling circuit, the input and output voltages are substantially in phase and effective to drive the motor to rebalance the system. However, before reaching the second point of balance and the corresponding null point $t_3$ in the input voltage, curve $a$, the output voltage, curve $f$, goes through a null point at $t_2$, at which it reverses phase relative to the input voltage. Therefore, the excitation of the winding 18$a$ of the positioning motor 18 is reversed at point $t_2$ and this reversed phase excitation is effective to reverse the torque of the motor 18, thereby dynamically braking the motor 18 and preventing overshooting thereof. It will be apparent that, as the motor slows down under the influence of the dynamic braking, the character of the signal $f$ will be modified and the point $t_2$ will approach the point $t_3$ so that the reversing torque will disappear as the motor reaches a point corresponding to the balanced condition of the system. Thus, the position follow-up system is inherently stable in operation and substantially free from hunting.

While there has been described what is at present considered to be the preferred embodiment of the invention, it will be apparent to those skilled in the art that various changes and modifications may be made therein without departing from the spirit or scope of the invention.

What is claimed as new is:

1. A self-tuning filter circuit for following variations in frequency of an applied periodic wave comprising, a pair of input terminals, a pair of branch circuits connected in parallel between said input terminals each including series-connected resistance and reactance elements, said elements being arranged in opposite order in said pair of circuits, a bridging circuit comprising series-connected resistance and reactance elements connected between midpoints of said branch circuits, a pair of output terminals individually connected to the midpoint of said bridging circuit and to one of said input terminals, whereby the response at said output terminals exhibits resonance characteristics, and means responsive to the frequency of the signal applied to said input terminals for varying the value of one of the circuit elements to maintain said resonant response at said output terminals.

2. A self-tuning filter circuit for following variations in frequency of an applied periodic wave comprising, a pair of input terminals, a pair of branch circuits connected in parallel between said input terminals each including series-connected resistance and capacitance elements, said elements being arranged in opposite order in said pair of circuits, a bridging circuit comprising series-connected resistance and capacitance elements connected between midpoints of said branch circuits, one of said resistance elements comprising the plate circuit of an electron discharge valve, a pair of output terminals individually connected to the midpoint of said bridging circuit and to one of said input terminals, whereby the response at said output terminals exhibits resonance characteristics, and means responsive to the frequency of the signal applied to said input terminals for varying the impedance value of said one of the circuit elements to maintain said resonant response at said output terminals.

3. A self-tuning filter circuit for following variations in frequency of an applied periodic wave comprising, a pair of input terminals, a pair of branch circuits connected in parallel between said input terminals each including series-connected resistance and capacitance elements, said elements being arranged in opposite order in said pair of circuits, a bridging circuit comprising series-connected resistance and capacitance elements connected between midpoints of said branch circuits, one of said resistance elements comprising the plate circuit of an electron discharge valve, a pair of output terminals individually connected to the midpoint of said bridging circuit and to one of said input terminals, whereby the response at said output terminals exhibits resonance characteristics, and means responsive to the response at said output terminals for varying the impedance value of said one of the circuit elements to maintain said resonant response at said output terminals.

4. A self-tuning filter circuit for following variations in frequency of an applied periodic wave comprising, a pair of input terminals, a pair of branch circuits connected in parallel between said input terminals each including series-connected resistance and capacitance elements, said elements being arranged in opposite order in said pair of circuits, a bridging circuit comprising series-connected resistance and capacitance elements connected between midpoints of said branch circuits, one of said resistance elements comprising the plate circuit of an electron discharge valve, a pair of output terminals individually connected to the midpoint of said bridging circuit and to one of said input terminals, whereby the response at said output terminals exhibits resonance characteristics, and means responsive to the relative phase of the signal at said input terminals and that at said output terminals for varying the impedance value of said one of the circuit elements to maintain said resonant response at said output terminals.

5. A self-tuning filter circuit for following variations in frequency of an applied periodic wave comprising, a pair of input terminals, a pair of branch circuits connected in parallel between said input terminals each including series-connected resistance and capacitance elements, said elements being arranged in opposite order in said pair of circuits, a bridging circuit comprising series-connected resistance and capacitance elements connected between midpoints of said branch circuits, one of said resistance elements comprising a bias-controlled impedance device, a pair of output terminals individually connected to the midpoint of said bridging circuit and to one of said input terminals, whereby the response at said output terminals exhibits resonance characteristics, and means responsive to the frequency of the signal applied to said input terminals for varying the bias of said device to maintain said resonant response at said output terminals.

6. A self-tuning filter circuit for following variations in frequency of an applied periodic wave comprising, a pair of input terminals, a pair of branch circuits connected in parallel between said input terminals each including series-connected resistance and capacitance elements, said elements being arranged in opposite order in said pair of circuits, a bridging circuit comprising series-connected resistance and capacitance elements connected between midpoints of said branch circuits, one of said resistance elements comprising a bias-controlled impedance device, a pair of output terminals individually connected to the midpoint of said bridging circuit and to one of said input terminals, whereby the response at said output terminals exhibits resonance characteristics, a repeater having grid and anode electrodes, connections for applying the input signal to one of said electrodes and the output signal to the other, means responsive to the output of said repeater for developing a bias voltage, and connections for applying said bias voltage to said device to maintain said resonant response at said output terminals.

7. A self-tuning filter circuit for following variations in frequency of an applied periodic wave comprising, a pair of input terminals, a pair of branch circuits connected in parallel between said input terminals each including series-connected resistance and capacitance elements, said elements being arranged in opposite order in said pair of circuits, a bridging circuit comprising series-connected resistance and capacitance elements connected between midpoints of said branch circuits, a pair of output terminals individually connected to the midpoint of said bridging circuit and to one of said input terminals, whereby the response at said output terminals exhibits resonance characteristics, and means responsive to the frequency of the signal applied to said input terminals for varying the value of one of said branch resistance elements to maintain said resonant response at said output terminals.

8. A self-tuning double-T filter for following variations in frequency of an applied periodic wave comprising, a first filter T-section comprising reactive series elements and a resistive shunt element, a second filter T-section comprising resistive series elements and a reactive shunt element, the open-end series-element terminals of said first filter section being connected to corresponding terminals of said second filter section and the open-end terminals of said shunt elements being connected to form a common terminal, one of said shunt elements comprising the plate circuit of an electron discharge valve, input terminals individually connected to said common terminal and one of said open-end terminals, output terminals individually connected to said common terminal and the other of said open-end terminals, and means responsive to a characteristic of the signal applied to said input terminals for varying the value of said one of said shunt elements to maintain said resonant response at said output terminals.

9. A self-tuning double-T filter for following variations in frequency of an applied periodic wave comprising, a first filter T-section comprising reactive series elements and a resistive shunt element, a second filter T-section comprising resistive series elements and a reactive shunt element, the open-end series-element terminals of said first filter section being connected to corresponding terminals of said second filter section and the open-end terminals of said shunt elements being connected to form a common terminal, said resistive shunt element comprising the plate circuit of an electron discharge valve, input terminals individually connected to said common terminal and one of said open-end terminals, output terminals individually connected to said common terminal and the other of said open-end terminals, and means responsive to a characteristic of the signal applied to said input terminals for varying the value of said resistive shunt element to maintain said resonant response at said output terminals.

10. In a position-repeating system including an alternating-current supply circuit, signal-transmitting and signal-receiving devices energized from said supply circuit and connected to form a normally balanced signaling circuit, and a polyphase positioning motor responsive to the unbalance of said signaling circuit and connected to one of said devices to rebalance said circuit; a self-tuning filter circuit having input terminals for connection to said signaling circuit and output terminals for connection to said motor and having a minimum response at said output terminals at the frequency of said supply circuit and, during transition from an unbalanced condition of said signaling circuit toward the balanced condition thereof, developing an alternating output signal which reverses phase and is effective to reverse the torque of said positioning motor to prevent overshooting thereof, said filter including means responsive to the frequency of the unbalance signal of said signaling circuit for varying the value of at least one of the filter elements to maintain said minimum response at said output terminals.

11. In a position-repeating system including an alternating-current supply circuit, signal-transmitting and signal-receiving devices energized from said supply circuit and connected to form a normally balanced signaling circuit, and a polyphase positioning motor responsive to the unbalance of said signaling circuit and connected to one of said devices to rebalance said circuit, said signal-receiving device developing an output signal comprising two components of frequencies equal to the sum and difference of the frequency of the supply circuit and a frequency corresponding to the speed of rebalance of said signaling circuit; a self-tuning filter circuit having input terminals connected to said signaling circuit and output terminals connected to said motor and having a minimum response at said output terminals at the frequency of said supply circuit and, during transition from an unbalanced condition of said signaling circuit toward the balanced condition thereof, developing an alternating output signal which is the sum of said sum and difference-frequency components to reverse the torque of said positioning motor to prevent overshooting thereof, said filter including means responsive to the frequency of the unbalance signal of said signaling circuit for varying the value of at least one of the filter elements to maintain said minimum response at said output terminals.

12. In a position-repeating system including an alternating-current supply circuit, signal-transmitting and signal-receiving devices energized from said supply circuit and connected to form a normally balanced signaling circuit, and a polyphase positioning motor responsive to the unbalance of said signaling circuit and connected to one of said devices to rebalance said circuit, said signal-receiving device developing an output signal comprising two components of frequencies equal to the sum and difference of the frequency of the supply circuit and a frequency corresponding to the speed of rebalance of said signaling circuit, a self-tuning filter circuit comprising a pair of input terminals connected to said signaling circuit, a pair of branch circuits connected in parallel between said input terminals each including series-connected resistance and reactance elements, said elements being arranged in opposite order in said pair of circuits, a bridging circuit comprising series-connected resistance and reactance elements connected between midpoints of said branch circuits, a pair of output terminals individually connected to the midpoint of said bridging circuit and to one of said input terminals, said output terminals being connected to said motor, said filter having a minimum response at said output terminals at the frequency of said supply circuit but having a substantial response at said sum and difference frequencies, whereby said filter, during the rebalancing of said signaling circuit, develops an alternating output signal which reverses phase and is effective to reverse the torque of said positioning motor to prevent overshooting thereof, said filter including means responsive to the frequency of the unbalance signal of said signaling circuit for varying the value of at least one of the filter elements to maintain said minimum response at said output terminals.

ELMER G. HILLS.

REFERENCES CITED

The following references are of record in the file of this patent:

UNITED STATES PATENTS

| Number | Name | Date |
|---|---|---|
| 2,372,419 | Ford et al. | Mar. 27, 1945 |
| 2,439,198 | Bedford | Apr. 6, 1948 |